United States Patent [19]

Lendi et al.

[11] 4,058,901
[45] Nov. 22, 1977

[54] PLUG GAGE

[75] Inventors: Georges Lendi, Crissier; Bruno Hardegger, Monaltorf; René De Trey, Bussigny, all of Switzerland

[73] Assignee: Tesa S.A., Vaud, Switzerland

[21] Appl. No.: 698,770

[22] Filed: June 22, 1976

Related U.S. Application Data

[63] Continuation of Ser. No. 531,663, Dec. 11, 1974, abandoned.

[30] Foreign Application Priority Data

Jan. 9, 1974 Switzerland .................... 219/74

[51] Int. Cl.² ............................................. G01B 5/12
[52] U.S. Cl. ................................................ 33/178 R
[58] Field of Search ........................ 33/178 R, 178 E

[56] References Cited

U.S. PATENT DOCUMENTS

| 1,664,535 | 4/1928 | Bartholdy | 33/178 R |
|---|---|---|---|
| 1,695,453 | 12/1928 | Carpenter | 33/178 R |
| 1,899,920 | 2/1933 | Litterio | 33/178 R |
| 2,369,319 | 2/1945 | Smith | 33/178 R |
| 2,799,092 | 7/1957 | Abramson | 33/178 R |
| 2,842,858 | 7/1958 | Mennesson | 33/178 R |
| 3,909,951 | 10/1975 | Meier | 33/178 R |

FOREIGN PATENT DOCUMENTS

| 882,970 | 3/1943 | France | 33/178 R |
|---|---|---|---|
| 859,811 | 12/1952 | Germany | 33/178 E |
| 482,794 | 8/1953 | Italy | 33/178 R |
| 218,397 | 12/1941 | Switzerland | 33/178 R |

Primary Examiner—Richard E. Aegerter
Assistant Examiner—Richard R. Stearns
Attorney, Agent, or Firm—Anthony J. Casella

[57] ABSTRACT

A measurement instrument in the form of a plug gage comprises a tubular body within which there is centered an axially movable rod, one end of which is intended to transmit the axial movements of said rod to a transducer system connected to the tubular body, while the other end thereof bears a conical part coaxial with said rod, with the lateral surfaces of the conical part resting against radially movable feeler balls, each of which is housed in a guide channel transverse to the longitudinal axis of the tubular body. The plug gage is characterized in that the tubular body bears over at least a portion of its length a coaxial centering sleeve which is removable and interchangeable, this sleeve being provided with transverse openings intended to permit the passage of the balls.

9 Claims, 13 Drawing Figures

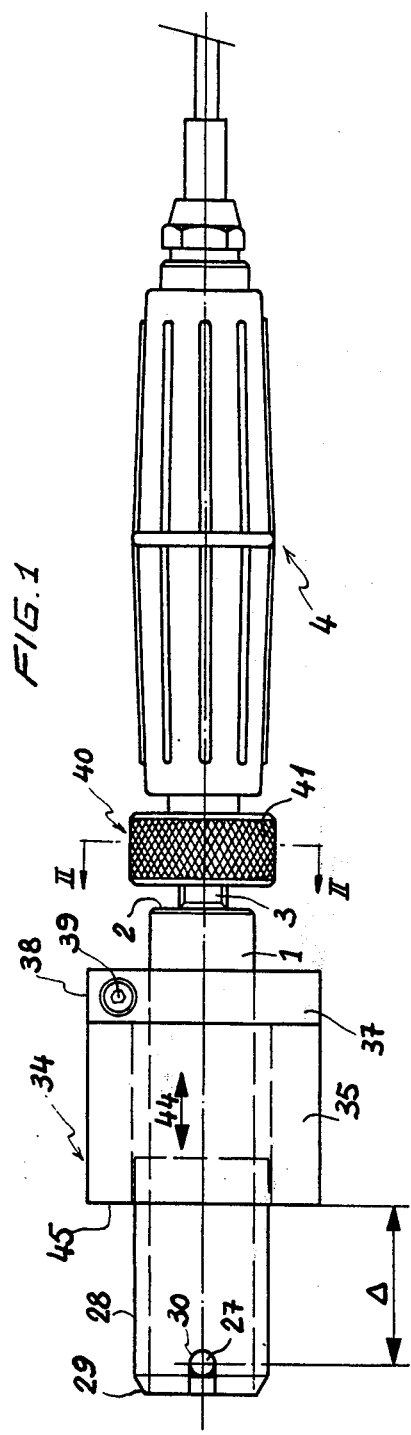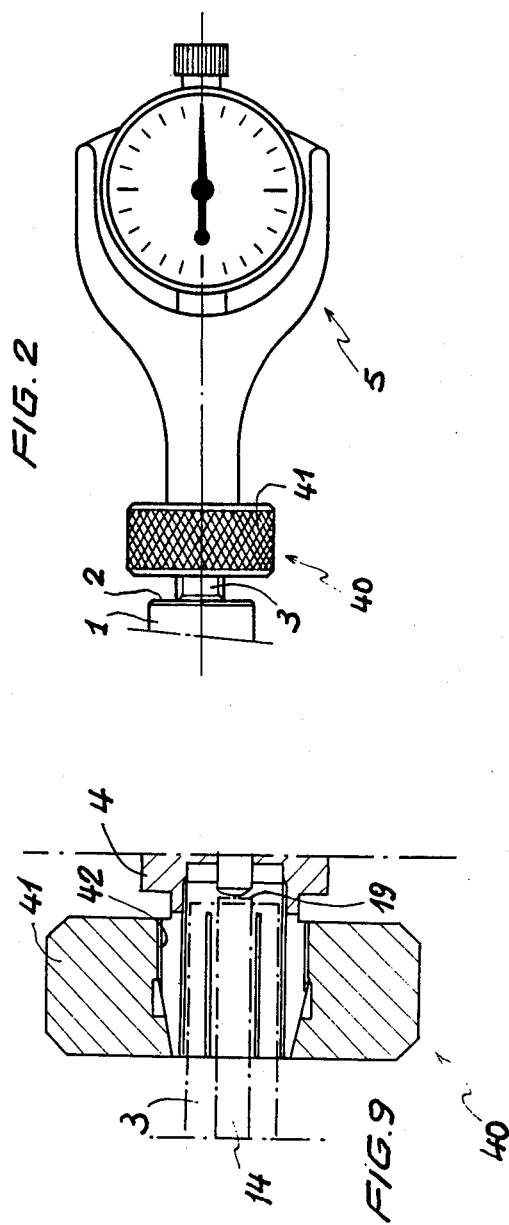

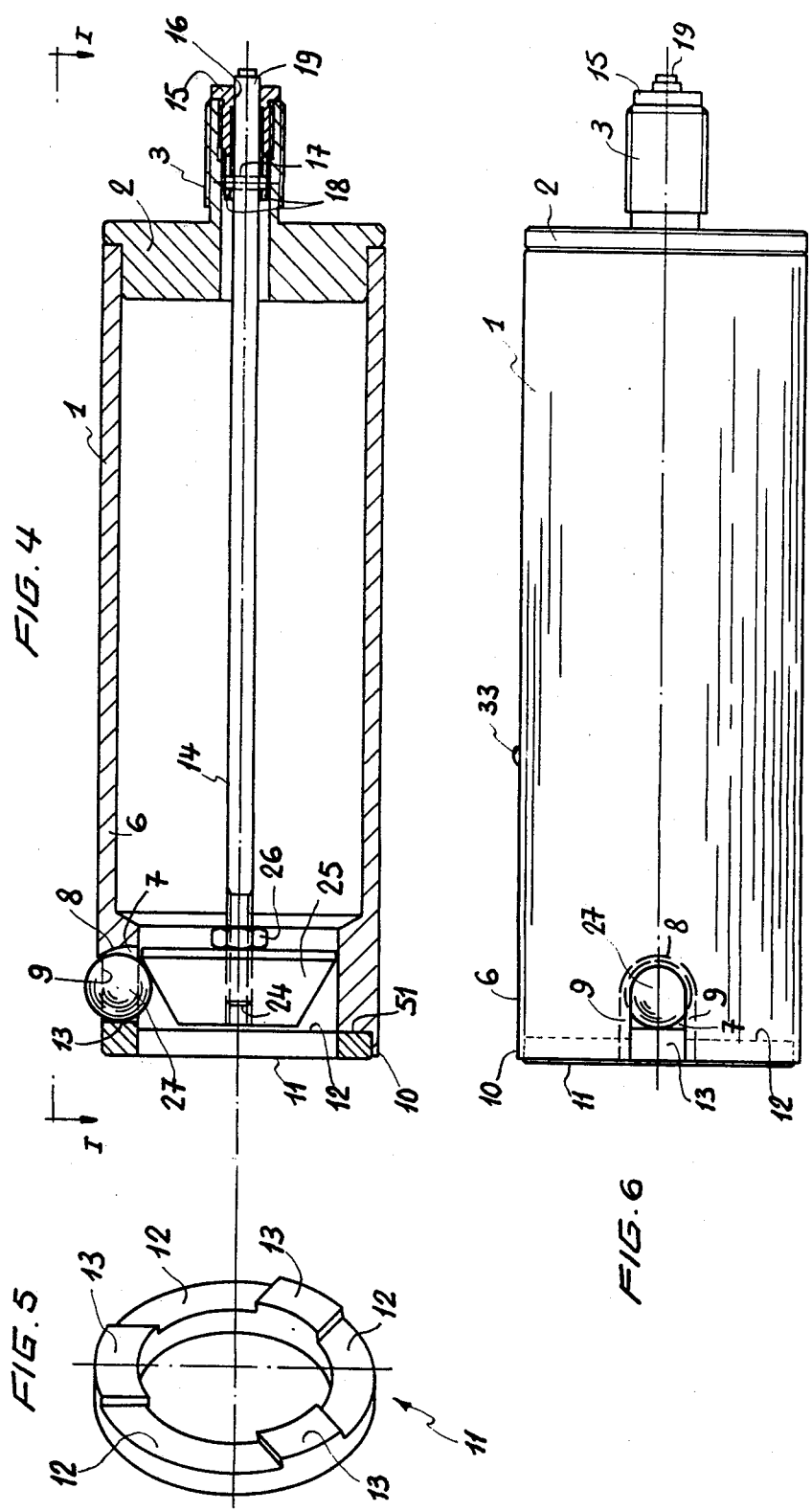

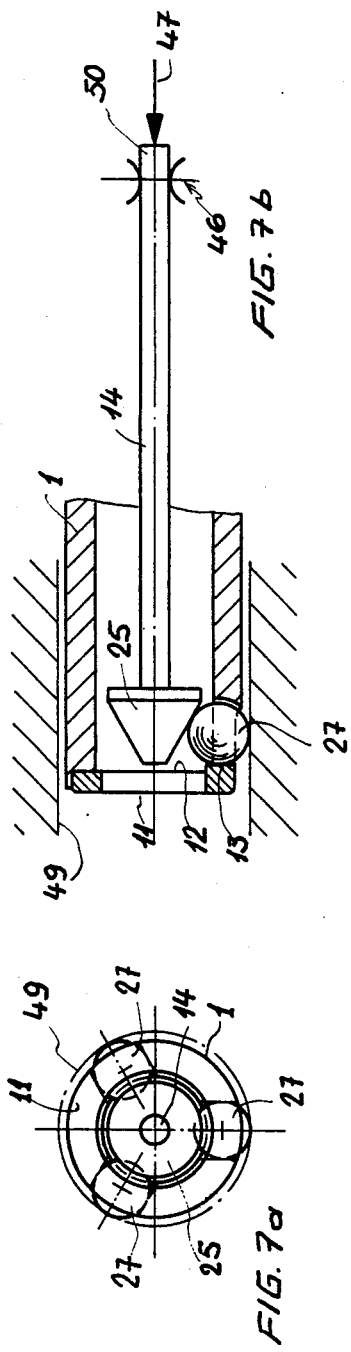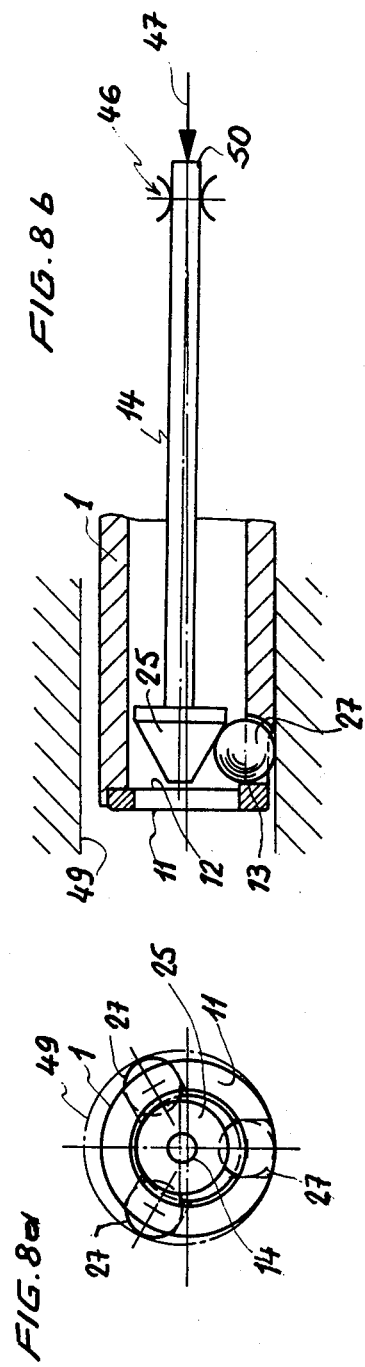

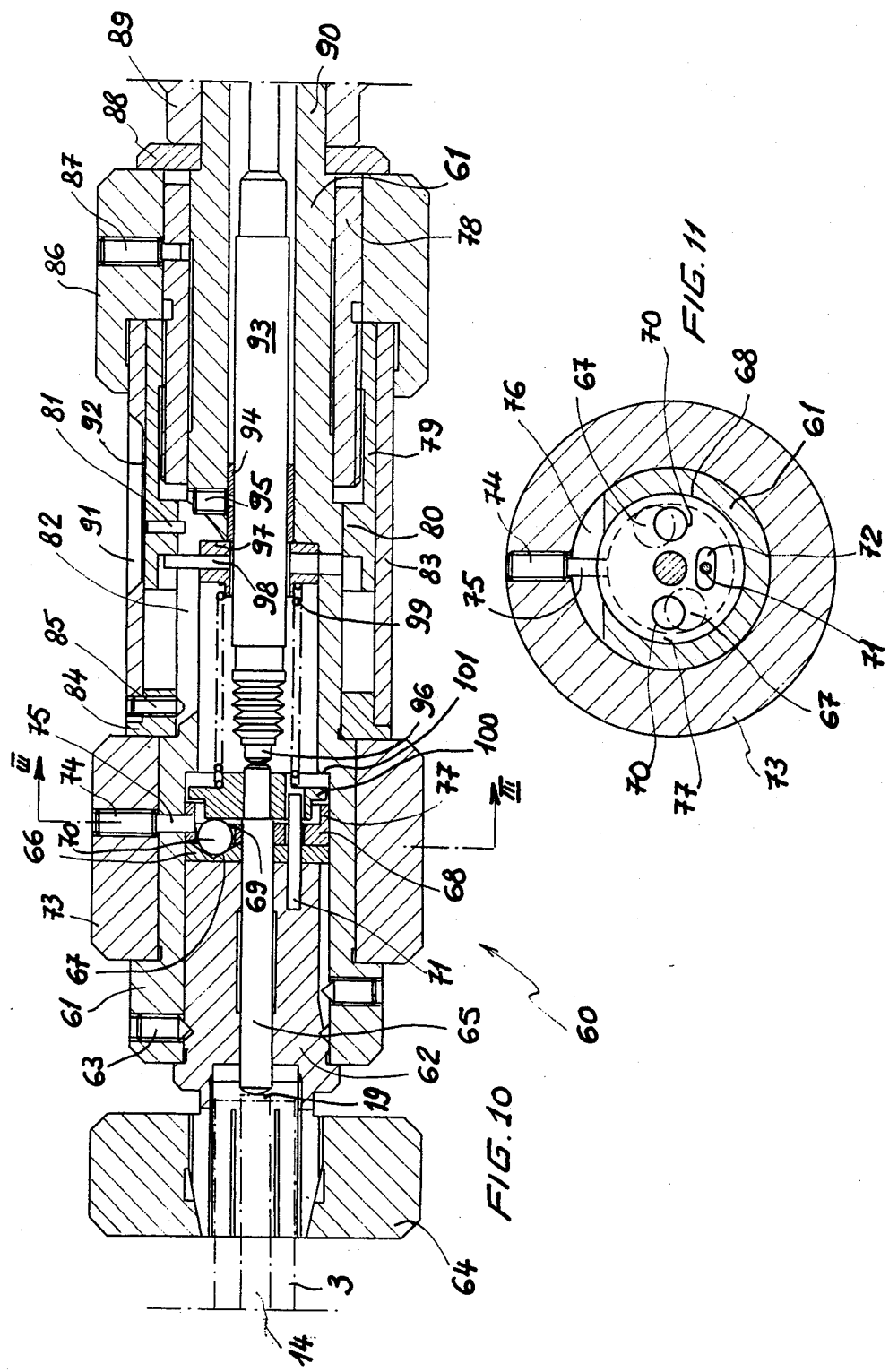

PLUG GAGE

This is a continuation of application Ser. No. 531,663, filed Dec. 11, 1974, now abandoned.

The present invention relates to plug gages comprising feeler balls which are movable in a direction perpendicular to the axis of the plug. These feeler balls, of which there are generally three, are housed with a certain play in a guide channel which passes through the wall of the plug and in which they are retained by crimping. Within the plug, the balls rest against a conical part which is centered on the axis of the plug and is rigidly connected with a rod which is movable axially in the plug, said rod transmitting its axial movements to a transducer system such as for instance an electronic sensor or a comparator. A return spring urges the conical part axially to hold it in contact with the feeler balls. As a result of this arrangement, any radial movement of the balls results in an axial displacement of the conical part and therefore of the rod which is connected to it and which acts on the transducer system, which thus gives information concerning the borehole felt by the feeler balls.

Various embodiments of this type of instrument are known. Thus Swiss Pat. No. 214,425 discloses such an instrument in which the balls are guided in a cylindrical guide channel.

Swiss Pat. No. 230,931 also discloses an instrument of this type in which, however, the feeler balls are guided and roll radially on a flat guide surface which is perpendicular to the axis of the rod.

The instrument of Swiss Pat. No. 230,931 has a substantial drawback, which is to be found furthermore also in the instrument of Swiss Pat. No. 214,425. In order to be used properly, this type of instrument must be correctly centered in the borehole which it is desired to measure. Now in order to be able to be centered properly the body of the instrument must be inscribed within a circle whose diameter is as close as possible to the diameter of the borehole to be measured, without running the risk of the plug being inclined in the borehole, in which case the measurement effected will not correspond to the diameter of the borehole since the points of contact of the balls with the borehole will no longer be in the plane perpendicular to the axis of the borehole. It follows that with a plug whose body is inscribed in a given diameter one can accurately measure only boreholes whose diameter is practically equal to the diameter of the plug (with the tolerance necessary for the introduction of the plug into the borehole), despite the fact that the useful stroke of the balls, that is to say the distance by which they can protrude radially out of the body of the plug, is rather high. Therefore, the theoretical capacity of the instrument as defined by the useful stroke of the balls cannot be utilized and one is forced to use several separate instruments even to cover a small range of measurements.

In order to overcome these drawbacks, the object of the present invention is a plug gage comprising a tubular body within which there is centered an axially movable rod whose one end is intended to transmit the axial movements of the said rod to a transducer system connected to the tubular body while its other end bears a conical part coaxial with said rod, whose lateral surface rests against radially movable feeler balls each of which is housed in a guide channel transverse to the longitudinal axis of the tubular body, characterized by the fact that the tubular body bears over at least a portion of its length a coaxial centering sleeve which is removable and interchangeable, this sleeve being provided with transverse openings intended to permit the passage of the balls.

The accompanying drawings show by way of example one embodiment and a variant of the object of the invention.

FIG. 1 is a side view, the instrument being connected to an electronic feeler;

FIG. 2 is a view showing part of the instrument of FIG. 1 connected to a comparator;

FIG. 4 is an enlarged longitudinal section through a detail of construction;

FIG. 5 is a perspective view of another detail of construction;

FIG. 6 is a view along the line I—I of FIG. 4.;

FIGS. 7a, 7b and 8a, 8b are partial, schematic, transverse and longitudinal sections respectively illustrating the operation of a detail of construction of the plug gage in accordance with the invention;

FIG. 9 is a section through a detail of construction of FIG. 1;

FIG. 10 is a partial longitudinal section through the variant embodiment;

FIG. 11 is a section along the line III—III of FIG. 10.

Figure 3:
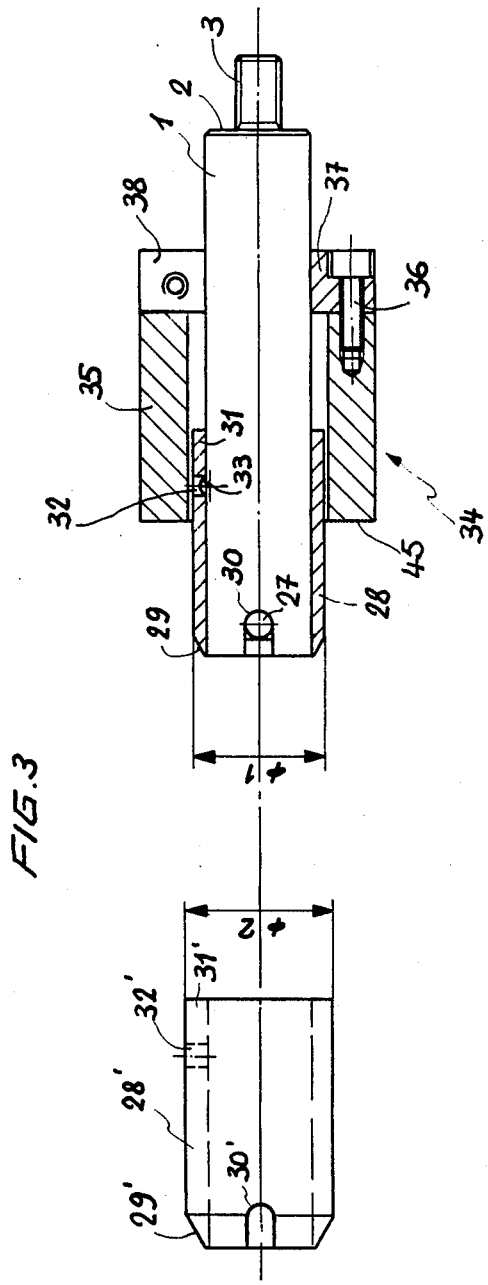
FIG. 3 shows the instrument of FIG. 1 with cross sections showing certain details.

The plug gage shown comprises a tubular body 1 the rear portion of which is closed by a disk 2 bearing, on the outside, a threaded tip 3 which is centered on the longitudinal axis of the tubular body 1 and is adapted to be connected to a transducer system such as, for instance, an electronic feeler 4, as shown in FIG. 1, or a comparator 5 as shown in FIG. 2, or any other transducer system permitting an analog or digital reading of the information supplied by the plug gage, or else the control system of a numerical control machine. The fastening of the transducer system 4 or 5 to the threaded tip 3 is effected by means of a clamping nut 40, such as shown schematically in FIG. 9. This nut comprises a knurled body 41 which is threaded on an externally threaded slit conical sleeve 42, which is also threaded on its inside. The tip 3 is screwed into the inside of the sleeve 42, which is rigidly connected with the transducer system, until the said tip 3 is in the axial position required with respect to the transducer system. The screwing of the knurled body 41 on the outer thread of the conical sleeve assures the locking of the assembly. This arrangement, which makes it possible to modify the relative axial position of the body 1 of the plug gage and the transducer system and to lock them in the selected position is however not limitative and may be replaced by any equivalent assembly which assures the same possibility of setting and locking the relative axial position of the plug gage in the transducer system.

In the front portion 6 of the wall of the body 1 there are provided three transverse openings 7 arranged 120° apart. Each of the openings 7 comprises a bottom 8 (FIGS. 4 and 6) transverse to the longitudinal axis of the body 1 and connected to two side walls 9 which are respectively parallel to the axis of the body 1. The bottom 8 of each of the openings 7 has the general shape of a rounded cup whose axis is tangential to an imaginary circle concentric to the axis of the body 1 while the side walls 9 also have a rounded cross section. This arrangement may, for instance, be obtained by means of a turning tool of corresponding shape whose axis of rotation is tangent to an imaginary circle concentric to the axis of the body 1 and which is displaced parallel to the axis of the body 1. There is thus obtained a housing or channel whose cross section decreases from the inside to the outside of the wall 6 of the body 1.

In the front end 10 of the body 1 (FIGS. 4 and 5) there is housed a ring 11 arranged facing the transverse wall 51 of the said body 1 and the surface of which located within the body 1 is formed of three crenelles 12 alternating with three flat bosses 13 perpendicular to the longitudinal axis of the body 1. The bottom of the crenelles 12 rests against the transverse wall 51 of the end 10 of the body 1, while the flat bosses 13 are introduced respectively into the openings 7 of which they constitute a flat closure wall perpendicular to the longitudinal axis of the body 1. Each opening 7 together with the corresponding boss 13 thus forms a guide channel. The ring 11 can be fastened to the body 1 in any conventional fashion commonly used in the art, for instance by means of screws, not shown, passing through the crenelles 12 and engaged in the transverse wall 51 of the end 10, or by cementing the bottom of the crenelles 12 against the transverse wall 51 of the end 10.

In the body 1 (FIG. 4) there is arranged a movable rod 14 whose end 19 is slidably engaged in a guide 15 centered and screwed in the threaded tip 3. The sliding of the rod 14 in the guide 15 takes place over a small portion 16 of the latter so that the contact between the rod 14 and the guide 15 is substantially reduced to a circular line or to a point, for instance there is play in the guiding. In FIG. 4, this contact has been greatly enlarged solely to facilitate the reading of the drawing. A pin 17 which is rigidly connected with the rod 14 slides in two grooves 18 of the guide 15 and prevents the rod 14 from turning on its axis. The end 24 of the rod 14 is centered and screwed in a conical part 25, a lock nut 26 assuring the locking of this attachment. The conical part 25 is arranged in the body 1 opposite the openings 7 and bears against three balls 27 housed respectively in the guide channels formed by the openings 7 and the bosses 13 of the ring 11. These balls 27 are housed in their respective guide channel with a certain play in order to be able to move freely in said guide channel, and their movements towards the outside of the body 1 are limited by the fact that the cross section of the openings 7 decreases from the inside of the wall 6 of the body 1 to the outside, thus forming a retention crimping for the ball.

On its front portion, the body 1 (FIGS. 1 and 3) bears a removable and interchangeable coaxial centering sleeve 28 whose front end 29 is chamfered and pierced by three transverse openings 30 120° apart intended to provide passage for the balls 27. The rear end 31 of the sleeve 28 is pierced by a hole 32 intended to engage on a retractable retaining ball 33 which protrudes from the wall of the body 1 (FIGS. 3 and 6) where it is in known manner crimped and movable transversely against the action of a spring (not shown). The arrangement of the retractable retaining ball 33 in the wall of the body 1 being known per se, it will not be described in further detail.

The rear portion of the body 1 bears a depth stop 34 (FIGS. 1 and 3) which is movable longitudinally along the body 1 (as indicated by the arrow 44 in FIG. 1) and comprises a cylindrical sleeve 35 concentric with the body 1 and the inside diameter of which is sufficiently large so that it can fit on the sleeve 28. The rear portion of the sleeve 35 is fastened by screws 36 against a clamping ring 37 surrounding the body 1 and is provided with a radial clamping slit 38 by means of which the ring 37 can be tightened on the body 1 by means of a screw 39 (FIG. 1) whose head rests in the wall of the ring 37 on one side of the slit 38 and the thread of which is engaged in an internal thread provided in the wall of the ring 37 on the other side of the slit 38.

The general operation of the plug gage described is as follows: when the rod 14 and therefore the conical part 25 are pushed axially towards the front end 10 of the body 1, the axial thrust of the conical part 25 is translated into a radial thrust on the balls 27 which are held against the narrowed section of the openings 7 which forms a retention crimping. When the plug gage is introduced into a borehole, the balls 27 move radially towards the inside of the body 1 and roll against the flat bosses 13 of the ring 11; this radial movement results in an axial displacement of the conical part 25 and therefore of the rod 14, and the end 19 of the rod 14 which extends from the tip 3 connected to the transducer system transmits to the latter the information received corresponding to the radial displacement of the balls 27.

This general operation is known per se and will not be described in further detail. On the other hand, the operation and the advantages resulting from the features peculiar to the plug gage of the invention will be explained in detail below.

As described previously, the plug gage in accordance with the invention comprises a removable interchangeable coaxial centering sleeve 28. This arrangement makes it possible to assure the centering of the plug in all boreholes which can be included within the measurement capacity of the instrument as defined by the useful stroke of the balls, and it also makes it possible to avoid the plug becoming inclined in the borehole which it is to measure. As a matter of fact, since the centering sleeve is removable and interchangeable, a complete set of sleeves can be used with a single instrument, each of them making it possible to center the instrument in one of the boreholes included within the measurement capacity of the instrument. In order to do this it is sufficient to withdraw the sleeve present on the body 1 and replace it by the sleeve whose diameter corresponds to that of the borehole to be measured (with the tolerance necessary for its introduction into the borehole) one thus avoiding miscentering or inclination of the plug in the borehole. FIG. 3 in its lefthand portion shows a sleeve 28' whose front end 29' has the openings 30' for the passage of the balls and the rear end 31' has the hole 32' intended to house the retaining ball 33 of the body 1. As shown in the drawing, this sleeve 28' has a diameter $\phi 2$ larger than the diameter $\phi 1$ of the sleeve 28 which is already on the body 1. The removal of the centering sleeves is effected easily since it is sufficient to force the longitudinal sliding of the sleeve along the body 1 in order for the balls 27 to be retracted in the body 1, as well as the retention ball 33. For the placing of a sleeve on the body 1, the opposite operation is carried out and the sleeve is slid onto the body 1 until the retaining ball 33 comes into the hole 32 of the sleeve, thus preventing any accidental axial or angular displacement of the sleeve with respect to the body 1. As they are merely centering elements, the removable interchangeable sleeves do not have to be of hardened metal and they may be made, for instance, of brass or of plastic, and as a result of this one has a plug gage whose measuring capacity can actually be entirely utilized with maximum precision and in a particularly advantageous manner since a single instrument will be sufficient for a large range of measurements. Of course, the plug could be used without centering sleeve. This however is not recommended since it may require the use of very thin and therefore delicate sleeves. As a matter of fact, if for instance, the minimum diameter which is capable of being measured by the instrument is 20 mm and the body 1 is imparted a diameter of 20 mm, when it is desired to measure a borehole of 21 mm with this same instrument, it will be necessary to use a sleeve of a thickness of 0.5 mm which will necessarily be delicate. It would therefore be preferable to impart the body 1 a diameter of 18 mm and compensate for the 2 mm difference from the minimum measurement diameter of 20 mm by a sleeve of a thickness of 1 mm; in this way, when a diameter of 21 mm is to be measured with the same instrument, the sleeve to be used will have to have a thickness of 1.5 mm and will therefore be sufficiently strong. Of course, the centering sleeves 28 can be extended over a larger or smaller portion of the length of the body 1.

It has previously been seen that the plug described comprises a depth stop 34 which is movable longitudinally along the body 1. This arrangement makes it possible to predetermine as desired the depth of sensing of the instrument, which is particularly useful when it is necessary to measure a series of boreholes at a given depth. Referring to FIG. 1, it is seen that the front face 45 of the sleeve 35 defines, with respect to the plane passing through the center of the balls 27, a dimension Δ which determines the depth at which the balls can feel when the front face 45 is applied against the walls bordering the borehole to be measured. By displacing the stop 34 along the body 1, one would therefore change the dimension Δ and accordingly the depth of feeling of the balls 27 in the borehole. The displacement of the depth stop 34 can be effected after having unscrewed the screw 39 which will have the effect of relaxing the clamping of the clamping ring 37. When the sleeve 35 is in the longitudinal position on the body 1, corresponding to the desired dimension Δ it is sufficient to tighten the screw 39 again so that the ring 37 is clamped against the body 1, thus assuring the locking of the depth stop 34. Aside from this, the sleeve 35 constitutes a handle by which the instrument can be held, this handle making it possible furthermore to provide a good heat insulation of the body 1 and of the structures of the instrument since there is an empty space between the body 1 and the sleeve 35.

FIGS. 7a, 7b, 8a and 8b illustrate the advantages of another feature of the plug gage in accordance with the invention. It has been previously seen that the rod 14 which bears the conical part 25 is slidably engaged in the guide 15 with which the end of the rod 14 is in contact over a portion substantially reduced to a circular line or a point. This arrangement is shown schematically at 46 in FIGS. 7b and 8b where, in order not to clutter the drawing, the body 1 of the gage plug is shown without the sleeve 28 and its advantage is that the conical part 25 is arranged in floating fashion at the end of a long support, in the present case the rod 14, while being guided and it can absorb any possible miscentering of the body 1 in the borehole to be measured, for instance if the plug is used with too small a sleeve for the borehole to be measured. In FIGS. 7a and 7b, the body 1 is shown correctly centered in the borehole 49. In this case the balls 27 move away equally from the axis of the body 1 and the conical part 25 will remain centered in the body 1 while the information transmitted by the rod 14 to the transducer system shown schematically at 47 will not be deformed. In FIGS. 8a and 8b the body 1 is shown miscentered in the borehole 49. In this case the balls 27 are displaced unequally with respect to the axis of the body 1, that is to say one of them will be pushed radially further into the body 1 than the two others. However, due to the fact that the conical part 25 floats it can follow the unequal radial displacements of the balls 27 which will therefore be compensated for by each other. The axial displacement of the conical part 25 will therefore remain correct since it will not be affected by the fact that the balls move unequally with respect to the axis of the instrument. Furthermore, as the oscillation of the conical part 25 takes place at the end of a lever arm which is relatively long as compared with the relatively short part 50 of the rod 14 which is located on the other side of the contact, reduced to a circular line 46 and acts on the transducer system 47, the flutter of this portion 50 of the rod 14 will be negligible and will not affect the information supplied to the transducer system 47.

In addition to the fact that it floats it has been seen that the conical part 25 is threaded onto the rod 14 where it is locked by the lock nut 26. This makes it possible, when signs of wear start to appear due to the pressure exerted by the balls 27, to modify the angular position of the conical part 25 with respect to the rod 14 so that it again presents an intact surface of contact with the balls. One thus has a simple way of compensating for wear of the conical part.

As described, the connection between the gage plug and the transducer system is effected by means of a locking nut which makes it possible to modify the relative position of the measurement plug and the transducer system. In this way one modifies the position of the feeler of the transducer system with respect to the end 19 of the rod 14, which affords the possibility of effecting an adjustment of the zero point of the transducer system.

Due to the fact that the ring 11 rests at three positions against the transverse wall 51 of the end 10 of the body 1, which positions are represented in the present case by the three resting crenulations 12, there is a stable support which makes it possible to obtain strict perpendicularity of the flat bosses 13 to the longitudinal axis of the body 1 and therefore of the flat guiding of the balls, which avoids any deformation of the information transmitted by the balls 27 when they roll against the said flat bosses 13. Furthermore, the grinding of the surfaces on which the balls roll is less expensive since it is sufficient to grind the surface of the bosses 13. Finally, when the ring 11 is fastened to the body 1 by cementing, the fact that the travel surfaces are staggered with respect to the support and fastening surfaces of the ring makes it possible to impart the support and fastening surfaces, that is to say the bottom of the crenulations 12, a roughness which permits a good adherence of the cement since the grinding of the travel surfaces is limited to the bosses 13 which are spaced from the bottom of the crenulations 12 and therefore from the transverse wall 51. Furthermore, there is no danger of the cement protruding onto the bosses, which avoids the necessity of cleaning the travel surfaces of the balls after the fastening of the ring 11.

Finally, the particular shape of the bottom 8 and of the side walls 9 of the openings 7, namely a sphere and a rounded transverse section respectively, prevents any risk of the balls jamming when they are resting against the restricted section of the said openings.

Of course, the plug gage in accordance with the invention could comprise only two diametrically opposite feeler balls.

In the variant embodiment shown in FIGS. 10 and 11, the measurement plug, which is the same as that previously described, is attached to a regulating handle 60 comprising a tubular body 61 into whose front end a slide piece 62 is introduced, held in place by screws 63 and bearing a clamping nut 64 similar to the clamping nut 40 previously described, and in which the tip 3 of the tubular body of the measurement plug is engaged. Within the slide piece 62 there slides a pin 65 intended to come into contact with the end 19 of the rod 14 protruding from the tip 3.

Against the end of the part 62 which is on the inside of the body 61 there is applied a disk 66 engaged on the pin 65 and in which two diametrically opposite conical recesses 67 are provided. The disk 66 is fixed and its firm holding of the part 62 is assured by a pin 72 which passes through it and is plugged into the part 62. The pin 65 can slide freely through the disk 66.

Against the disk 66 there is arranged a plate 68 mounted with play on the pin 65 for rotation in the body 61 and provided with two diametrically opposite transverse openings 69 in each of which there is housed, with a certain amount of play, a ball 70 whose diameter is substantially greater than the thickness of the plate 68. The transverse opening 69 of the plate 68 as well as the conical recesses 67 of the disk 66 are centered respectively on the same diameter so that they can come opposite each other upon the rotation of the plate 68. The pin 71 which holds the disk 66 passes through a slit 72 (FIG. 11) of the plate 68 thus limiting the rotation of the latter.

On the tubular body 61 there is rotatably mounted a drum 73 comprising a radial set screw 74 whose end 75 passes through a transverse slit 76 (FIG. 11) in the body 61 to engage in a shoulder 77 of the plate 68. Thus the plate 68 is rigidly connected angularly to the drum 73.

On the rear portion of the body 61 there is rotatably mounted a threaded sleeve 78 in engagement in an internally tapped tube 79 having a shoulder 80 via which it slides on the body 61. The internally threaded tube 79 is angularly stationary, a pin 81 fastened to the shoulder 80 sliding respectively in a corresponding longitudinal groove 82 provided in the body 61, assuring the angular securing thereof.

Above the internally threaded tube 79 there is arranged a tubular sleeve 83 whose end rests against a ring 84 mounted on the body 61 and adjoining the drum 74. The sleeve 83 is fastened to the ring 84 by means of screws 85 passing through the said ring 84 and the end of which engages in grooves 82 of the body 61, this arrangement preventing any rotation of the sleeve 83. The other end of the sleeve 83 rests in a drum 86 mounted on the sleeve 78 to which it is fastened by a set screw 87. Against the drum 86 there is applied a washer 88 which is held in place by the front portion 89 of the housing of the transducer system which is engaged on the end 90 of the tubular body 61 to which it is fastened for instance by means of screws, not shown. Thus the drum 86 can turn on its axis but any axial movement on its part is prevented and the same is true of the threaded sleeve 78 which is rigidly connected with it. The tubular sleeve 83 is provided with an opening 91 through which a portion 92 of the surface of the internally threaded tube 79 is seen.

The feeler 93 of the transducer system extends within the tubular body 61, said feeler 93 being guided by a sleeve 94 fastened in the body 61 by a screw 95. The end 96 of the movable pin of the feeler 93 comes against the end of the pin 65. On the feeler 93 there is slidably engaged a rest stop 97 comprising three pins 98 arranged 120° apart and extending respectively into grooves 82 of the body 61. Each of these pins 98 rests against the shoulder 80 of the internally threaded tube 79. A compression spring 99, arranged concentrically to the feeler 93, rests on the one hand against the rest stop 97 and on the other hand against a disengagement stop 100 forcefitted on the end of the pin 65 to which it is rigidly fastened. The stop 100 comes to rest against the balls 70 of the plate 68 and its axial movements are limited by a wall 101 of the body 61. The stop 100 is also provided with a slit intended to permit passage of the pin 71.

This variant embodiment operates as follows: by turning the drum 73, the plate 68 is rotated and therefore also the balls 70. The latter are continuously subjected to the thrust of the stop 100 as a result of the action of the spring 99. Due to this, when — as a result of the rotation of the plate 68 — the balls arrive opposite the conical recesses 67 of the disk 66 they are pushed into said recesses 67 and as a result of this retraction the stop 100 can move correspondingly in the direction of action of the spring 99. This movement carries along the pin 65 with it, the pin then coming into contact with the end 19 of the rod 14 and exerting a thrust on it which will in turn reflect on the conical part 25 (FIG. 4) and therefore on the balls 27. This thrust, which tends to apply the balls 27 against their crimp constitutes the measuring force, that is to say the force with which the balls 27 will be applied against the walls of the bore hole which is to be measured. It should be noted that the measuring force as well as the holding of the balls 27 in measuring position is assured solely by the spring 99. When the drum 73 is turned in the opposite direction, the plate 68 drives the balls 70 which emerge from the recesses 67. In this way the balls 70 push the stop 100 back against the action of the spring 99. The stop 100 drives the pin 65 along with it and the pin frees itself from the end 19 of the rod 14 and the balls 27 of the plug are then freed from any supporting force.

As has been previously seen, the measuring force is established by the spring 99. By turning the drum 86 which is fixed axially the threaded sleeve 78 which is in engagement with the internally threaded tube 79 is driven along. As this tube is axially movable but angularly fixed, the rotation of the threaded sleeve 78 will cause its axial displacement and therefore the axial displacement of the stop 97 whose pins 98 rest against the shoulder 80. Any axial displacement of the stop 97 will result in a change in the tension of the spring 99 and therefore of the force acting on the pin 65, the rod 14, the conical part 25 and the feeler balls 27. One thus obtains a progressive adjustment of the measuring force. During the axial displacements of the internally threaded tube 79, the portion 92 of the surface of the said internally threaded tube 79 which is opposite the opening 91 in the sleeve 83 comes in front of said opening. This portion 92 is provided with a calibration (not visible in the drawing) which cooperates with a reference mark on the sleeve 83 (not visible in the drawing) to permit the selection of the measuring force. Likewise the drum 86 bears a graduation which cooperates with an index mark on the sleeve 83 to indicate the fractions of the calibration appearing on the portion 92 of the tube 79.

One thus has simple and effective means for disconnecting the feeler balls from the transducer system and regulating the measuring force. It will be noted that the measuring force is obtained by a single spring on the outside of the measuring plug proper and that it is this same spring which assures the operation of the system for the disconnecting of the feeler balls and the transducer system.

The drum 73 which serves to control the connection and disconnection between the feeler balls and the transducer may be controlled manually, that is to say directly or else indirectly, for instance by means of a train of gears permitting remote control.

The part 93 has been described as being the feeler of the transducer system. This however is not limitative since it is clear that this part 93 may be a pin acting on the feeler of the transducer system. Likewise the pins 65 and 96 could be of one piece, the resting against the feeler of the transducer being then transferred to the end of this piece.

The stroke of the disengagement stop 100 under the action of the balls 70 may be determined as desired. However, one will preferably provide a stroke which is smaller than that of the feeler of the transducer system so as to avoid the danger of the latter being damaged upon the disengagement. Likewise the total stroke of the stop 100, that is to say the distance by which it can move when the pin 65 is accidentally pushed all the way back for any reason is limited by the wall 101 of the body 61 so that it is less than the total stroke of the feeler, this again as a safety measure.

What is claimed is:

1. A plug gauge comprising:
    a. a tubular body;
    b. a rod housed in said body, said rod axially movable within said tubular body;
    c. a conical element mounted on one end of said rod, coaxially thereto;
    d. said tubular body formed with at least two guide channels, said guide channels transverse to the longitudinal axis of said tubular body;
    e. a radially movable feeler ball housed in each of said guide channels, said feeler balls resting against the side surface of said conical element;
    f. wall means integral with said tubular body to retain said feeler balls within said guide channels; and
    g. coaxial centering sleeve means detachably engaged over said tubular body and said wall means to surround said tubular body over at least a portion of the length thereof, said sleeve means provided with transverse openings to permit passage of said feeler balls, whereby said centering sleeve means may be removed and replaced by another centering sleeve means detachably engaged over said tubular body and said wall means to surround said tubular body over at least a portion of the length thereof and provided with transverse openings to permit passage of said feeler balls.

2. A plug gauge according to claim 1, wherein each of said guide channels is formed by an opening transverse to the wall of the tubular body, said opening comprising a bottom transverse to the longitudinal axis of the tubular body and two side walls, said gauge further comprising a ring having crenelles alternating with flat bosses, wherein the bottom of said crenelles rest against an end wall of said tubular body and said flat bosses are respectively introduced into said openings, whereby each said flat boss constitutes a flat wall perpendicular to the longitudinal axis of the tubular body and forms a flat guide surface on which the feeler ball is guided and rolls.

3. A plug gauge according to claim 2, wherein said ring comprises three crenelles alternating with three bosses.

4. A plug gauge according to claim 1, wherein said one end of said rod is threaded and said conical element is screwed onto said threaded portion of the rod and blocked by a lock nut.

5. A plug gauge according to claim 1, further comprising:
    a. a tubular regulating handle, said tubular handle attached to said tubular body;
    b. a pin housed in said tubular handle, said pin slidably arranged within said tubular handle for axial movement therein, said pin adapted to come into contact with the other end of said rod;
    c. a movable stop mounted on said pin, said stop rigidly connected to said pin;
    d. a biasing means acting on said movable stop to urge said pin against said rod to push the same for applying the conical element against the feeler balls;
    e. a surface fixed within said tubular handle and disposed in front of said movable stop, said surface having recesses formed therein;
    f. a plate disposed between said movable stop and said surface, said plate having transverse openings formed therein, said plate movable with respect to said surface and said pin from a first position wherein said openings are aligned with the recesses of said surface to a second position wherein said openings are not aligned with said recesses of said surface;
    g. a ball housed with play in each of the transverse openings of said movable plate, said balls having a diameter which is substantially greater than the thickness of said plate to simultaneously contact both stop and said surface; and
    h. means to move said movable plate to said first position wherein said openings are aligned with said recesses, and to said second position wherein said openings are not aligned with said recesses.

6. A plug gauge according to claim 5, wherein said surface is formed of a disk in whose suface conical recesses are provided.

7. A plug gauge according to claim 6, wherein the movable plate is rotatable.

8. A plug gauge according to claim 5, further comprising a rest stop disposed in said tubular handle against said biasing means, means for movably adjusting said rest stop within said tubular handle in the direction of said pin, whereby the displacement permitted thereby makes it possible to modify the tension of said biasing means.

9. A plug gauge according to claim 8, wherein said rest stop comprises on a portion of its outer surface a calibration cooperating with a reference mark arranged on said tubular handle to permit the selection of the force exerted by said biasing means on the movable stop.

* * * * *